Nov. 11, 1924.                                                1,514,626
F. McLAUGHLIN
MEANS FOR RESILIENTLY MOUNTING VEHICLE BODIES, SEATS, AND THE LIKE
Filed Oct. 20, 1922          2 Sheets-Sheet 1

Francis McLaughlin
INVENTOR:
By Otto [illegible]
his Attorney.

Nov. 11, 1924.
F. McLAUGHLIN
1,514,626
MEANS FOR RESILIENTLY MOUNTING VEHICLE BODIES, SEATS, AND THE LIKE
Filed Oct. 20, 1922  2 Sheets-Sheet 2
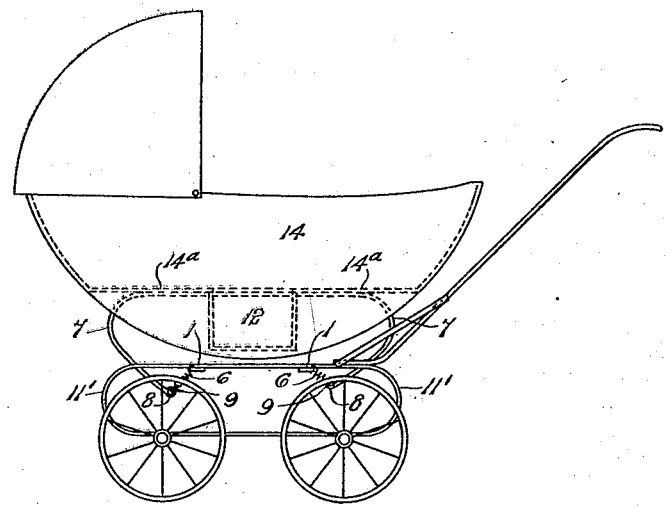
FIG_3_
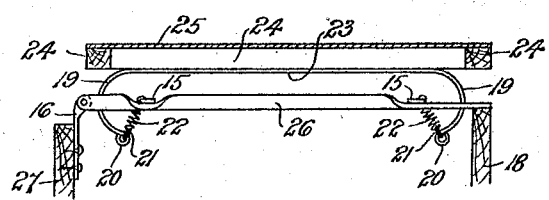
FIG_4_
Francis McLaughlin
INVENTOR;
By Otto Munk
his Attorney.

Patented Nov. 11, 1924.

1,514,626

UNITED STATES PATENT OFFICE.

FRANCIS McLAUGHLIN, OF WELLINGTON, NEW ZEALAND.

MEANS FOR RESILIENTLY MOUNTING VEHICLE BODIES, SEATS, AND THE LIKE.

Application filed October 20, 1922. Serial No. 595,765.

*To all whom it may concern:*

Be it known that FRANCIS MCLAUGHLIN, of 13 Girton Terrace, Wellington, in the Dominion of New Zealand, a citizen of the British Empire, has invented new and useful Improved Means for Resiliently Mounting Vehicle Bodies, Seats, and the like, of which the following is a specification.

This invention relates to means for resiliently mounting perambulator and push cart bodies or seats and the like and is also applicable to resiliently mounting automobile, railway carriage and the like seats and other analogous purposes such as operating tables. The invention is particularly applicable to collapsible push carts in connection with which the usual resilient body mounting means cannot be employed as they do not permit of the push cart being collapsed. The invention however is applicable not only to collapsible push carts but also to the above mentioned and analogous uses, as the invention provides a great degree of buoyancy with a minimum of jarring. The means herein described may, to suit different uses, be slightly altered or modified in a manner obvious to anyone skilled in the art and without altering the principle thereof in any way.

The invention broadly comprises the provision of transverse bars suitably supported on the frame work or undercarriage of the seat, or pushcart and resilient means connecting said transverse bars to means supporting the body or seat of the push cart or the like seat whereby the body or seat is capable of free vertical, lateral or longitudinal movement.

The arrangement is such that the supported body or seat is free to move either laterally vertically or longitudinally in accordance with the movement of the resilient means, thus ensuring a maximum of comfort to the occupant. Said means are such that, in their application to collapsible push carts they permit of the cart being easily collapsed in the usual way.

The invention consists in these features and in the features and arrangements and combinations of parts hereinafter described and more particularly pointed out in the claims.

Figure 1:
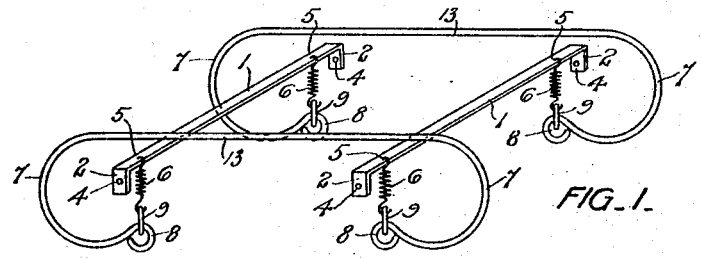
Figure 2:
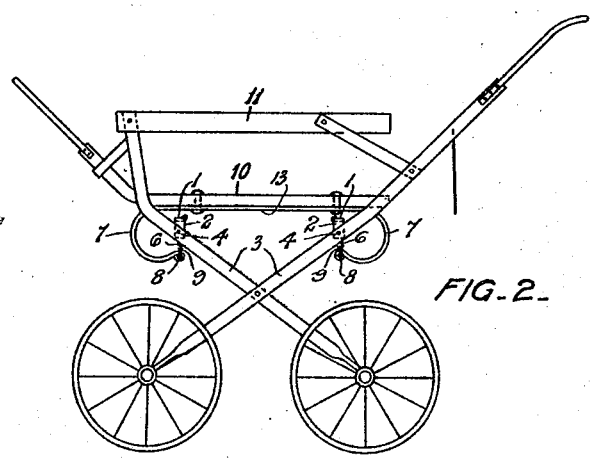
Figure 5:
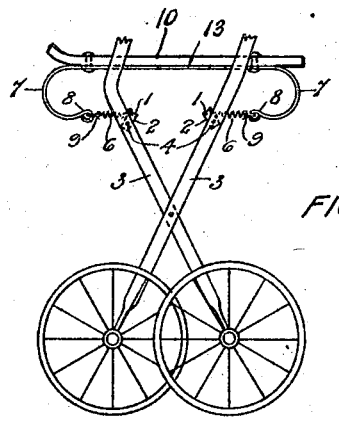

Referring to the accompanying drawings which illustrate one embodiment of the idea underlying the invention Figure 1 is a perspective elevation of the apparatus showing the relation of the various parts, Figure 2 is a side elevation showing the apparatus as applied to an ordinary wickerwork collapsible push cart, the top covering being removed for the sake of clearness. Figure 3 is a side elevation showing the device as applied to an ordinary type of non-collapsible perambulator and Figure 4 is a sectional elevation showing the apparatus as applied to the seat of an automobile or similar vehicle and Figure 5 represents the position of the transverse bars and springs when the push cart is collapsed. Referring to Figures 1 and 2 of the drawings, which illustrate the apparatus as applied to a collapsible push cart there are two parallel transverse or cross bars 1 bent at right angles at either end as at 2 said bent ends being provided with holes 4 to enable the said cross bars 1 to be secured to the supporting cross pieces 3 of the undercarriage. Downwardly secured as at 5 from each end of the cross bars 1, are four coil springs 6 or other resilient means the other ends thereof being preferably secured to links 9 secured in the eyes 8 at the ends of two inverted U shaped spring members 7. It will be seen that the body 11 is secured to the cross pieces 3 of the undercarriage but the seat 10 is secured by riveting or fastening it in any other suitable manner to the straight portions 13 of the spring members 7 the seat 10 being free to move in relation to the body 11. The result of this arrangement is that whilst the body 11 remains more or less rigid, the seat 10 is resiliently mounted on the spring members 7 and can move freely to correspond with the movement of said springs 6. It can be seen that great buoyancy by this arrangement is acquired. When the push cart is collapsed in the usual way the cross bars 1 are moved accordingly by reason of the inward movement of the cross pieces 3, the springs 6 and links 9 slipping over the eyes 8 till they reach a substantially horizontal position each pair facing the other.

Figure 3 illustrates the application of the apparatus to an ordinary type of perambulator in which 14 is the body of the perambulator and 14ª the bottom of the body with a central depression 12. Usually in this type of push cart the bottom of the body 14ª is secured on either side to the elliptical bands of metal 11'. The present invention is applied by securing the spring members 7 to either side of the bottom 14ª of the body 14 and the transverse or cross bars 1 to the elliptical bands 11'. The transverse bars 1 are connected to spring members 7 by rings 9 and springs 6, as hereinbefore described. This gives the same resilient mounting to the body 14 of the push cart. In Figure 4 is illustrated one adaptation of the apparatus to an automobile seat of an ordinary type, wherein transverse bars 15 are riveted to supporting bars 26, the rear ends of which are attached to the hinge bars 16 which are secured to the body 27 of the vehicle. The front ends of the bars 26 rest upon the opposite portion 18 of the body. The bent ends 19 of spring members 23 are provided with loops 20 and rings 21 are suspended by springs 22 from the bars 15. The horizontal portion of the spring members 23 is secured to the underside of the framing 24 of the seat, the framing 24 being preferably covered with seagrass 25 to form a seat. It will be seen that great resiliency is obtained and the seat may be swung back on the hinges in the usual way.

I claim:—

1. Spring supporting means of the character described, comprising inverted parallel U-shaped spring members, transverse rigid members disposed between said spring members adjacent the ends thereof, resilient means connecting said spring members and said rigid members, and a platform connected to the closed portions of said U-shaped spring members.

2. In a collapsible vehicle, the combination with a pair of frames on either side of said vehicle, each frame consisting of two members pivoted together intermediate the ends thereof, of transverse rigid members attached to the opposite parallel members of said frames, a body portion disposed between said frames, inverted parallel U-shaped spring members disposed longitudinally of said vehicle, said body rigidly attached to the closed portions of said spring members, and resilient means connecting said spring members and said transverse rigid members to support the body.

In witness whereof I affix my signature.

FRANCIS McLAUGHLIN.

Witnesses:
ANDREW JOHN PARK, Jr.,
CHARLES MACKINTOSH HILL.